United States Patent [19]

Kornelis

[11] Patent Number: 5,037,595
[45] Date of Patent: Aug. 6, 1991

[54] METHOD OF MOLDING A PLASTIC LID WITH BARRIER LAYER

[75] Inventor: Wiebren D. H. Kornelis, MC Steenwijk, Netherlands

[73] Assignee: Kornelis' Kunsthars Producten Industrie B.V., Steenwijk, Netherlands

[21] Appl. No.: 471,067

[22] Filed: Jan. 29, 1990

Related U.S. Application Data

[63] Continuation of Ser. No. 53,012, May 22, 1987, abandoned.

[30] Foreign Application Priority Data

May 30, 1986 [NL] Netherlands .......................... 8601405
Sep. 22, 1986 [NL] Netherlands .......................... 8602387

[51] Int. Cl.⁵ .............................................. B29C 45/16
[52] U.S. Cl. ..................................... 264/153; 264/247; 264/259; 264/268; 425/809
[58] Field of Search ............... 264/268, 247, 259, 266, 264/267, 46.9, 46.4, 153; 425/809, 126.1, 444

[56] References Cited

U.S. PATENT DOCUMENTS

| | | | |
|---|---|---|---|
| 3,511,902 | 5/1970 | Santangelo | 264/163 |
| 3,896,959 | 7/1975 | Roy | 215/348 X |
| 4,076,790 | 2/1978 | Lind | 264/266 |
| 4,421,705 | 12/1983 | Hatakeyama | 425/809 |
| 4,459,092 | 7/1984 | Hatakeyama | 425/112 |
| 4,545,752 | 10/1985 | Hanamoto et al. | 425/112 |
| 4,588,465 | 5/1986 | Paciorek | 264/268 |
| 4,728,477 | 3/1988 | Dromigny | 264/334 X |

FOREIGN PATENT DOCUMENTS

| | | | |
|---|---|---|---|
| 0186015 | 7/1986 | France | 264/163 |
| 163544 | 10/1982 | Japan | 264/268 |
| 58-220716 | 12/1983 | Japan | 264/163 |
| 159342 | 9/1984 | Japan | 264/269 |
| 60-51410 | 11/1985 | Japan | 264/163 |
| 85-01472 | 4/1985 | World Int. Prop. O. | 264/511 |

Primary Examiner—James Lowe
Attorney, Agent, or Firm—Watson, Cole, Grindle & Watson

[57] ABSTRACT

A method of making lids involves providing multiple mold parts which are movable between open and partially telescoped closed conditions, provision of a barrier strip or laminate which includes foamed plastic material, closing the mold parts to define a lid-shaped cavity with one of its inner and outer surfaces defined by a registered portion of the strip and spraying preheated plastic which adheres to the strip to fill the cavity and form the lid. The registered portion may be cut out during closing of the mold parts.

15 Claims, 4 Drawing Sheets

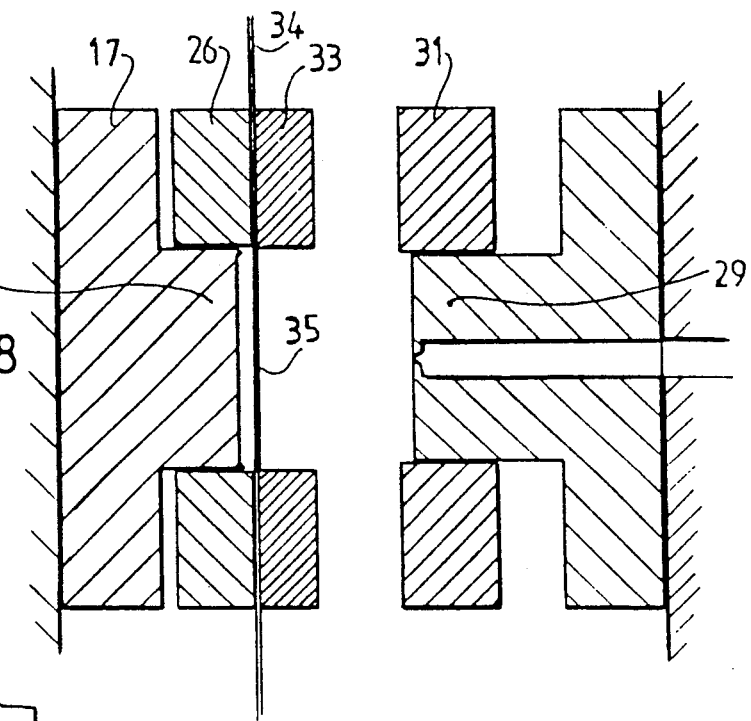
FIG. 8
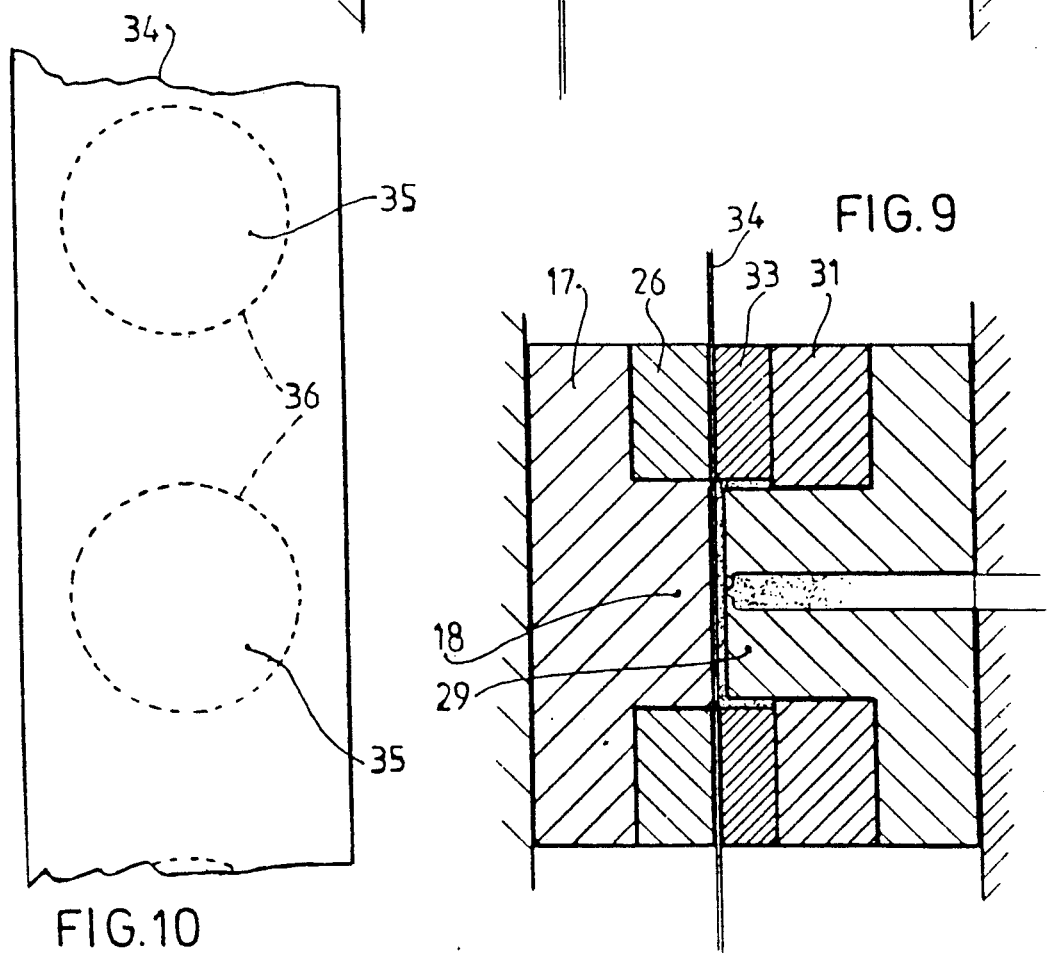
FIG. 9
FIG. 10

METHOD OF MOLDING A PLASTIC LID WITH BARRIER LAYER

This application is a continuation, of application Ser. No. 053,012, filed May 22, 1987, now abandoned.

The invention relates to a method of manufacturing a synthetic resin or plastic lid or cap provided with a coating consisting of foil material.

Such a plastic lid can, e.g., be used as a part of a closure for containers for, e.g., foodstuff requiring the use of an oxygen-barrier for which the normal plastics are not adequate. Such a lid can also be provided with a foil serving as a seal for a container, the foil being connected with the container while positioning the lid. When removing the lid the foil has to keep the container closed in the form of a diaphragm and therefore has to be adhered to the lid in a relatively weak fashion.

Usually, use is made of polyolefins, such as polypropylene, polyethylene, etcetera, materials which are permeable to a high degree.

There are plastic materials, such as eval (evoh) or pvdc having a low permeability and good barrier properties. Clamped in barrier-foils, however, they find general application in flexible containers, such as bags, wrappers, etcetera.

It is a purpose of the invention to provide a method, by means of which in a very simple and thus cheap manner a plastic lid provided with a coating of foil material can be manufactured.

In view thereof the invention proposes a method comprising the following steps:

positioning a layer of foil material in a moulding cavity of a spraycast-mould, the cavity having a shape adapted to the plastic lid to be manufactured;

after closing the mould cavity, spraying into the cavity a preheated plastic material that can adhere to the foil material; and opening the mould and removing the lid thus formed.

It is noted that from the article "In-mold decorating upgraded" from the magazine "Modern Plastics INternational", McGraw Hill, June 1986, vol. 16, no. 6, page 66 of Kurz and Battenfeld, a method is known in which a foil provided with a printing runs through a spraycast mould for printing by means of transfer-printing method, of the mould product. Therefore this article relates to the application of a generally known method of application of printing patterns, texts and the like. The printings are present on a strip of carrier material that as such does not play a role in the process and is wound on a winding reel after the printing patterns have been removed from it. The present invention, on the contrary, relates to the application of a layer of foil material that is not carried by a layer of carrier material.

Preferably the method according to the invention is carried out in such a way that the foil material is brought into the mould cavity by removing it from a piece of foil material positioned, in the opened position of the mould, between the two spaced-apart mould halves and then closing the two mould halves such that their cooperating edges cut the foil layer.

Also the invention relates to a method of manufacturing a plastic lid provided with a membrane to be used as a seal for a container to be closed by means of the plastic lid. This method according to the invention is characterized by the use of a foil material having a weak adhesion with the plastic of the lid. This method can be carried out, e.g., in such a way that the foil material is adhered to the lid on discrete zones, e.g., points. In this connection it should be noted that a zone-wise adhesion, e.g., on discrete points, can have the advantage that between both sides of the foil a pressure equalization can take place due to which the risk is avoided that in case of closing by the lid of a container with sub-atmospheric pressure the foil is torn off the lid as a result of that sub-atmospheric pressure.

A further way of carrying out the method according to the invention is characterized in that a strip of foil material is previously provided locally with at least one coating or printing and is, in view of an easy removing of the related parts by the mould, provided with a weakening line extending around every, part that is provided with a coating or a printing, the weakening line being in the form of, e.g., a line of perforations. In this way an easy removing of the related parts by means of simple means is guaranteed.

In a certain embodiment the method cân be carried out in such a way that a layer of foil material comprising a layer of foam-plastic is used. The layer of foil material can be designed as a laminate, of which the layer of foam-plastic material forms part, or consist only of the layer of foam plastic material. In case of application of this method a plastic lid is obtained in which the coating of foil material is resiliently compressable. An important application of such a lid is closing containers in which food stuff is present and for which an oxygen barrier is required. Thus far it was usual to use therefore a special filling mass or compound. Such a filling mass requires an additional production step and causes an increase in costs. The method according to the invention herein described above gives the possibility of refraining from the use of a compound, whilst nevertheless a perfect sealing of the contents of the container is guaranteed, by the barrier properties of the layer of foil material on the one hand and due to the fact that the layer of foam-plastic material has the function of the compound, namely the adaptation to irregularities, if any, at the upper edge of the container, on the other hand.

Furthermore the invention relates to a plastic lid provided with a coating and obtained by the application of one of the methods herein mentioned before.

Finally the invention relates to a synthetic resin or plastic material spray cast mould, that is, according to the invention provided with a coating of foil material and obtained by application of the method according to anyone of the preceding paragraphs.

The invention will now be explained in more detail with reference to the accompanying drawings.

BRIEF DESCRIPTION OF THE DRAWINGS

FIGS. 8 and 9 show two successive phases of an alternative method; and

FIG. 10 shows a special foil strip provided with weakening contours.

DETAILED DESCRIPTION OF THE PREFERRED EMBODIMENTS

Figure 1:
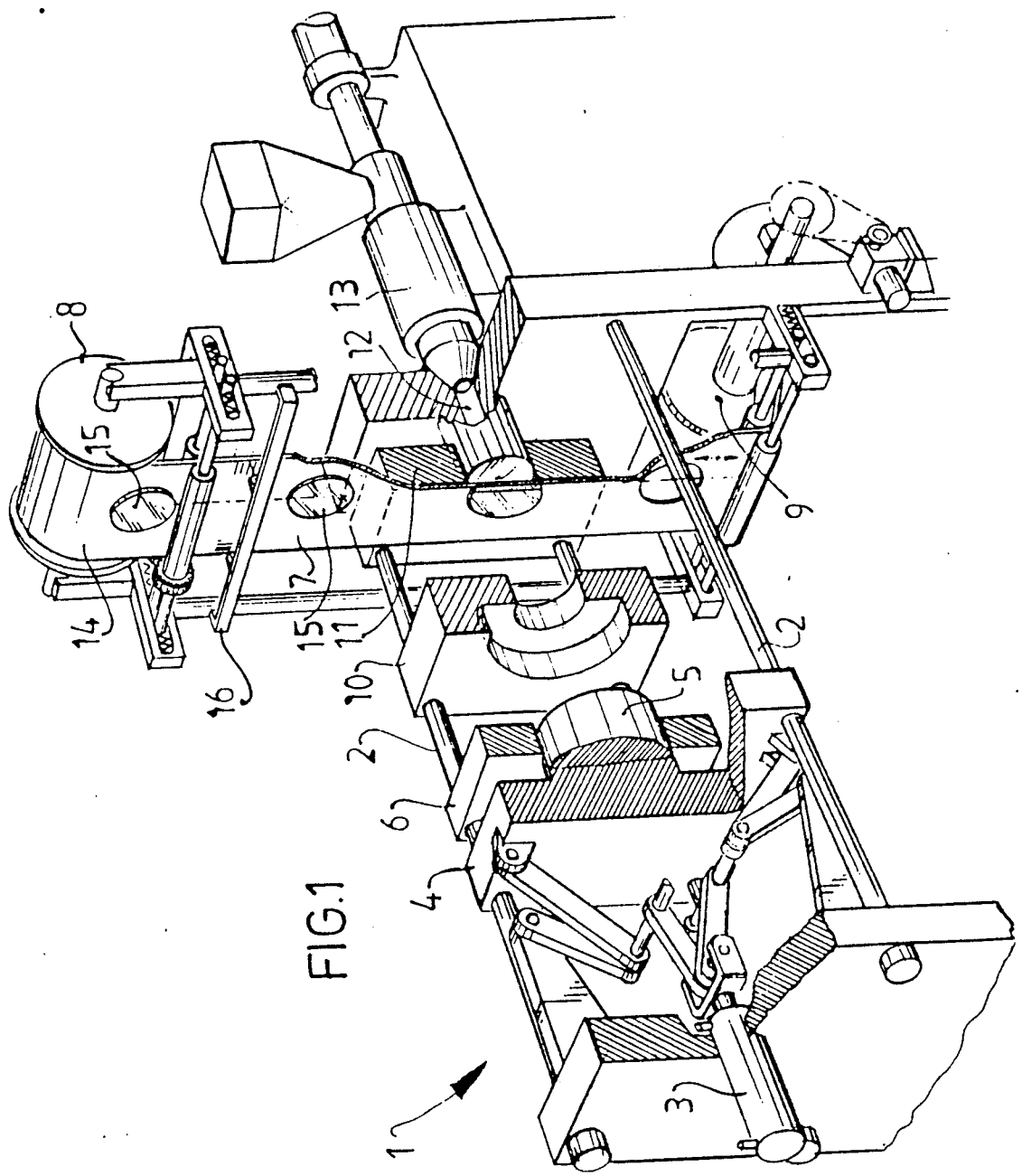
FIG. 1 shows a schematic perspective view, partially broken away, of a spraycast apparatus according to the invention.

FIG. 1 shows a spraycasting apparatus 1 provided with a mould consisting of several parts. A pressure plate 4, which is shiftable by means of guidance bars 2 and actuatable by means of a hydraulic cylinder 3 supports a mould part 5 surrounded by a shifting plate 6. A strip 7 of foil material extends between a supply reel 8 and a winding reel 9 between mould parts 10 and 11. Through an injection opening 12 a casting assembly 13 is connected with the mould part 11.

The strip 7 of foil material comprises a carrier layer 14, on which with previously determined spacings additional layers 15 are formed, so that locally a coating or printing is present.

In this embodiment registration means 16 are present, which are adapted to exactly position the covers or printings 15 successively, in such a way that during the closing of the mould they are brought into the moulding cavity thereof.

Figure 2:
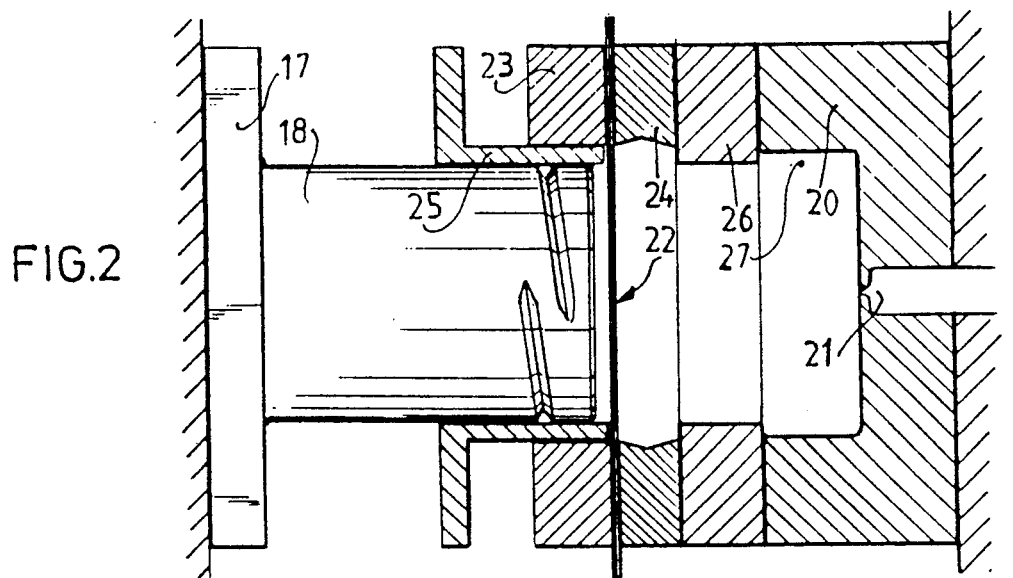
FIGS. 2, 3 and 4 show three successive phases of a spraycasting method according to the invention.
Figure 4:
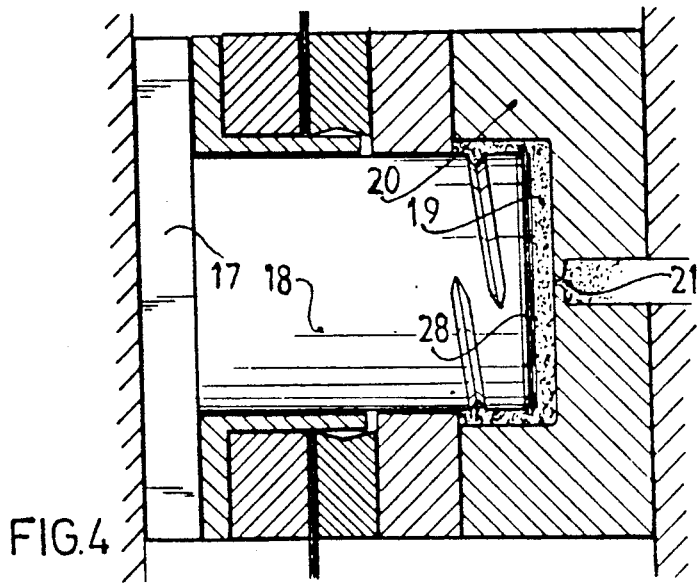

FIG. 2 shows a cross-section through a mould. A pressure plate 17 carries a mould part 18, the foremost part of which forms part of the boundary of the moulding cavity 19 as is indicated in FIG. 4.

A stationary mould part 20 is provided with the spraycasting opening 21. A foil strip 22 extends between a guiding ring 23 and a cutting ring 24 that can punchingly cooperate with a punch 25. A ring 26 forms together with a recess 27 in the stationary mould part 20 and the front part of the mould part 18 the moulding cavity 19 that exhibits a shape adapted to the shape of a lid to be manufactured. The mold cavity 19 will be seen to be of cup-shaped form with cylindrical sides.

FIG. 2 shows the phase in which the mould is ready to be closed.

Figure 3:
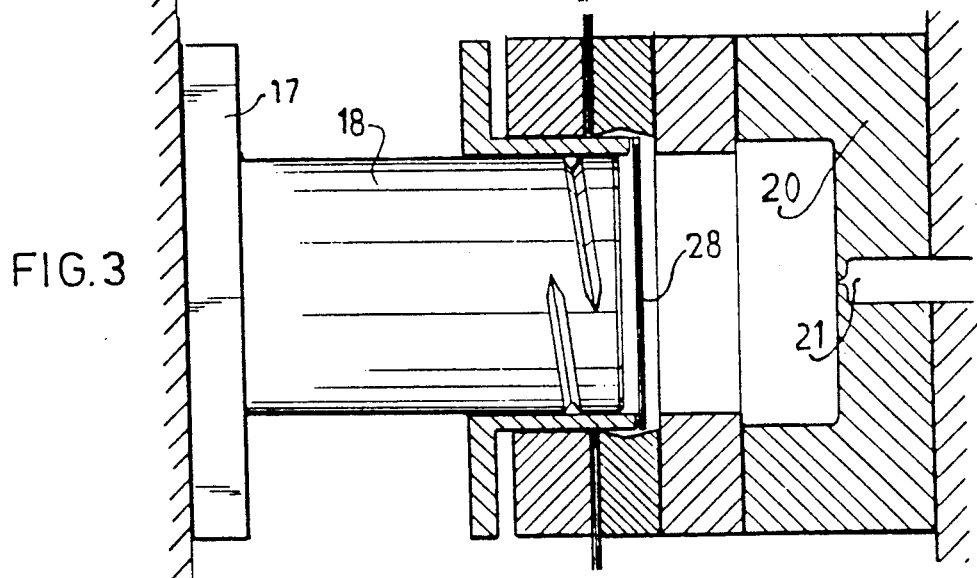

FIG. 3 shows the phase in which by means of a punching operation a laminate part 28 has been punched out by the punch 25 and is ready to be conveyed by the front surface of the mould part 18.

The phase according to FIG. 4 is the phase in which by supplying preheated synthetic resin material under pressure through the spraycasting opening 21 the moulding cavity 19 is filled for the formation of a lid at the inner surface of which the 28 coating of foil material is present.

Figure 5:
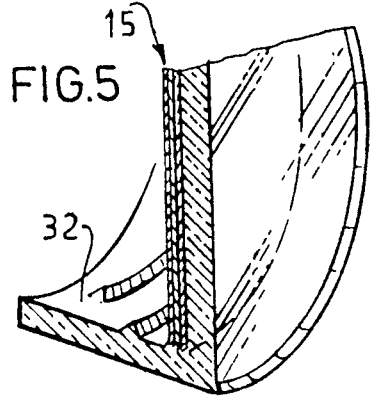
FIG. 5 shows a perspective view, partially broken away of a lid according to the invention.

FIG. 5 shows a ready product, namely a lid 32 made of transparent material. A laminate foil 28 is as a coating which includes the foil strip 7 and the additional layers 15 present at the inner side of the lid 32. Thus the foil 15 serves as a barrier and also as a non-removable printing element.

Figure 6:
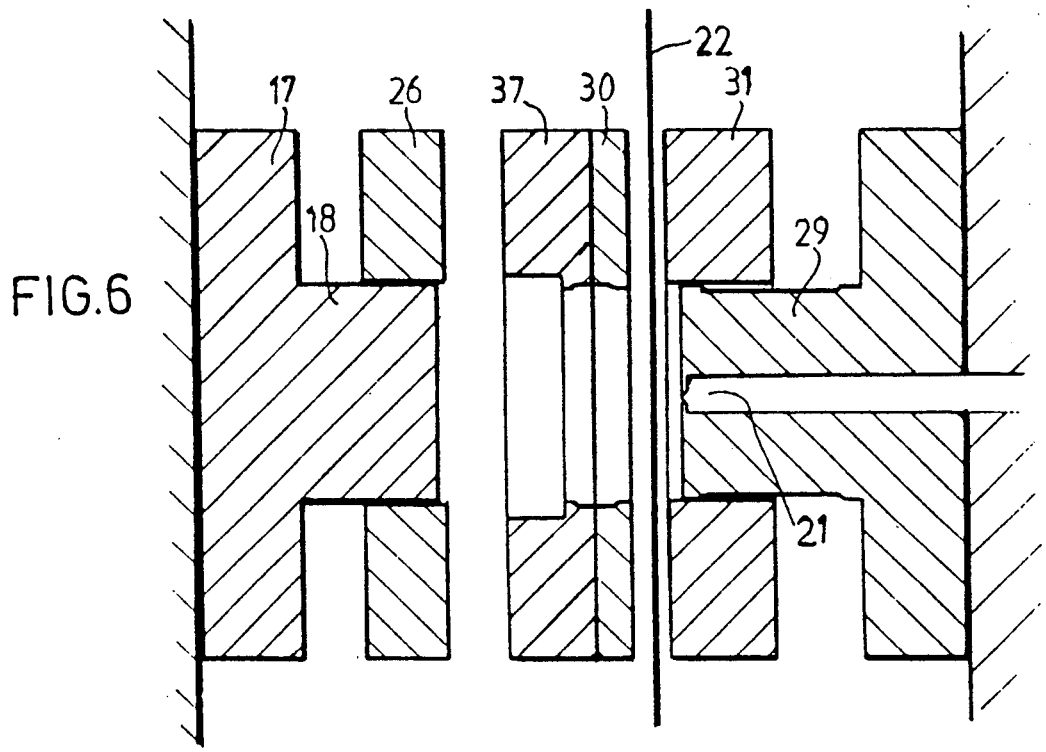
FIGS. 6 and 7 show two successive phases of a spraycast operation according to the invention.
Figure 7:
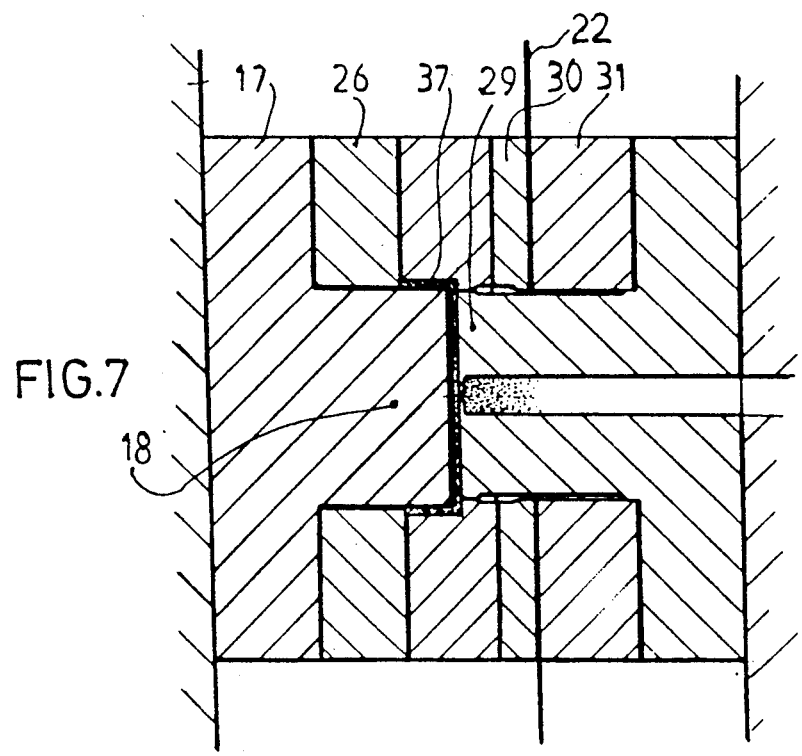

FIG. 6 shows an alternative embodiment. In this case the moulding cavity is bounded by the front zone of the mould part 18, the front surface of a mould part 29, in which also the spraycast opening 21 is present, the ring 26 and a ring 37. The foil strip 22 is clamped during the closing of the mould between a ring 30 and a ring 31. After the explanation relative to FIGS. 2, 3 and 4 as given above the method according to FIGS. 6 and 7 will need no further explanation.

FIGS. 8 and 9 show an alternative embodiment. In this embodiment a coating 35 of foil material is affixed to the outer side surface of a plastic or synthetic resin lid. A foil strip 34 is clamped during the closing of the mould between the ring 26 and a ring 33. Due to the high pressure and temperature in this embodiment the coating is pressed out of the foil strip 34. In this embodiment, therefore, no longer use is made of a mechanical punching operation. For ease in removing of parts 35 provided with local printing patterns (see FIG. 10) of the foil strip 34 by the mould around those parts 35, perforated lines 36 having the shapes of circular contours are present.

It should be noted that the embodiments shown in the drawings are only exemplary embodiments serving the purpose of explaining the principles of the invention. Many other implementations of the method according to the invention are possible.

If desired the foil material can consist of a plurality of layers, each exhibiting a certain desired property, such as the mentioned barrier-properties for oxygen, carbon-dioxide, water vapour and the like, mechanical resistance, etcetera. Already reference has been made to the possibility of applying even the most complicated types of printing patterns by applying to the inner side surface of a transparent type of plastic, previously printed foil material.

Finally it should be noted that a coating can be separated from the foil strip by means of a local heat treatment at the circumference in the mould. For this purpose an electrical heating may be used.

EXAMPLE I

Lid provided with a laminate foil WB-40/P-40, commercially available form the firm Envie of Assen, the Netherlands, having a total thickness of about 100 um. The laminate consists of a foam-plastic foil WB-40 and a barrier foil P-40. The oxygen-permeability thereof amounts to 5,5 $g/m^{2/24}h$ at a pressure of $10^5$ Pa, a temperature of 23° C. and a relative humidity of 0-90%.

EXAMPLE II

Lid provided with a laminate foil having a total thickness of about 500 um consisting of a foam-plastic foil of foamed polyethylene, commercially available from the firm Hoechst, and the foil P-40 specified in example I. The resilient properties were sufficient for maintaining a vacuum in a closed container.

EXAMPLE III

Lid provided with a laminate foil having the same construction as in example II, but provided with a foam plastic foil made of polypropylene.

We claim:

1. The method of making lids for containers which comprises the steps of:
   (a) providing a plurality of mold parts which are movable between a separated condition having a space for passage of a strip of film material and a partially telescoped closed condition to define a lid-shaped mold cavity having inner and outer faces defined between a first mold part which is spaced from a second mold part;
   (b) moving the mold parts to the separated condition;
   (c) providing a continuous laminate strip comprised of a barrier plastic film material having limited oxygen permeability and a layer of foamed plastic material;
   (d) stepwise advancing the laminate strip through said space to register a portion of the laminate strip between the mold parts;
   (e) moving the mold parts to the partially telescoped closed condition with the registered portion of the laminate strip engaging said one mold part so that said one mold part with engaged registered portion of the strip defines one of said inner and outer faces of the mold cavity;

(f) injecting preheated plastic material which adheres to the plastic film material into the mold cavity to fill the mold cavity and form a lid;

(g) moving the mold parts to the separated condition and recovering a first lid having said registered portion adhered thereto; and (h) repeating steps (d)-(g) to recover a subsequent lid.

2. The method as defined in claim 1, wherein the foamed plastic material of the continuous laminate strip provided in step (c) is foamed polyethylene.

3. The method as defined in claim 1, wherein the foamed plastic material of the continuous laminate strip provided in step (c) is foamed polypropylene.

4. The method as defined in claim 1 wherein step (f) comprises injecting preheated plastic material through said second mold part against said registered portion to force said registered portion against said first mold part while filling the mold cavity.

5. The method as defined in claim 1, wherein the laminate strip provided in step (c) includes printing thereon; and step (f) comprises injecting a transparent plastic material whereby the lid is transparent and the printing is readable therethrough.

6. The method as defined in claim 1, wherein in step (f) contact of said preheated plastic material against said strip portion causes said strip portion to separate from said strip.

7. The method as defined in claim 6, wherein said strip includes perforations which define said strip portion.

8. The method of making closures for containers which comprises the steps of:

(a) providing a plurality of mold parts movable between a separated condition having a space for passage of a strip of film material and a partially telescoped closed condition to define a lid-shaped mold cavity having inner and outer face defined between a first mold part which is spaced from a second mold part;

(b) moving the mold parts to the separated condition;

(c) providing a continuous strip of barrier plastic film material having limited oxygen permeability;

(d) stepwise advancing the strip of plastic film material through said space to register a portion of the strip between the mold parts;

(e) moving the mold parts to the partially telescoped closed condition while cutting out the registered portion of the strip and advancing the cut-out registered portion by said one mold part into the mold cavity so that said one mold part with engaged registered portion of the strip defines said inner face of the mold cavity;

(f) injecting preheated plastic material which adheres to the plastic film material into the mold cavity through said second mold part and against said registered portion so that the registered portion forms an inner surface of a closure;

(h) moving the mold parts to the separated condition and recovering a first closure having said registered portion adhered thereto; and (i) repeating steps (d)-(h) to make and recover a subsequent closure.

9. The method as defined in claim 8 wherein step (c) comprises providing a laminate consisting of a continuous carrier strip of barrier plastic material and registered portions of foamed plastic material.

10. The method as defined in claim 9 wherein step (c) comprises providing a laminate in which the foamed plastic material is foamed polyethylene.

11. The method as defined in claim 9 wherein step (c) comprises providing a laminate in which the foamed plastic material is foamed polypropylene.

12. The method as defined in claim 8 wherein step (c) comprises providing the strip with printing thereon; and step (f) comprises spraying a transparent plastic material through said first mold part whereby the closure is transparent and the printing is readable therethrough.

13. The method of making closures for containers which comprises the steps of:

(a) providing a plurality of mold pars which are movable between a separated condition having a space for passage of a strip of film material and a closed condition to define a lid-shaped mold cavity having inner and outer faces defined between a first mold part which is spaced from a second mold part;

(b) moving the mold parts to the separated condition;

(c) providing a continuous strip having limited oxygen permeability and comprised of a layer of foamed plastic material;

(d) stepwise advancing the strip through said space to position a portion of the strip between the mold parts;

(e) moving the mold parts to the closed condition with the portion of the strip engaging said one mold part so that said one mold part with engaged portion of the strip defines one of said inner and outer faces of the mold cavity;

(f) injected preheated plastic material which adheres to the foamed plastic material into the mold cavity to fill the mold cavity and form a lid;

(g) moving the mold parts to the separated condition and recovering a first lid having said strip portion adhered thereto; and (h) repeating steps (d)-(g) to recover a subsequent lid.

14. The method as defined in claim 13, wherein in step (f) contact of said preheated plastic material against said strip portion causes said strip portion to separated from said strip.

15. The method as defined in claim 14, wherein said strip includes perforations which define said strip portion.

* * * * *